May 26, 1959  A. CLAAS ET AL  2,888,088
CARRIER FOR AGRICULTURAL MACHINERY
Filed Dec. 5, 1956  4 Sheets-Sheet 1

Inventors
A. Claas, W. G. Brenner, H. Roderfeld and
R. Claas
BY Richards y Geier
ATTORNEYS

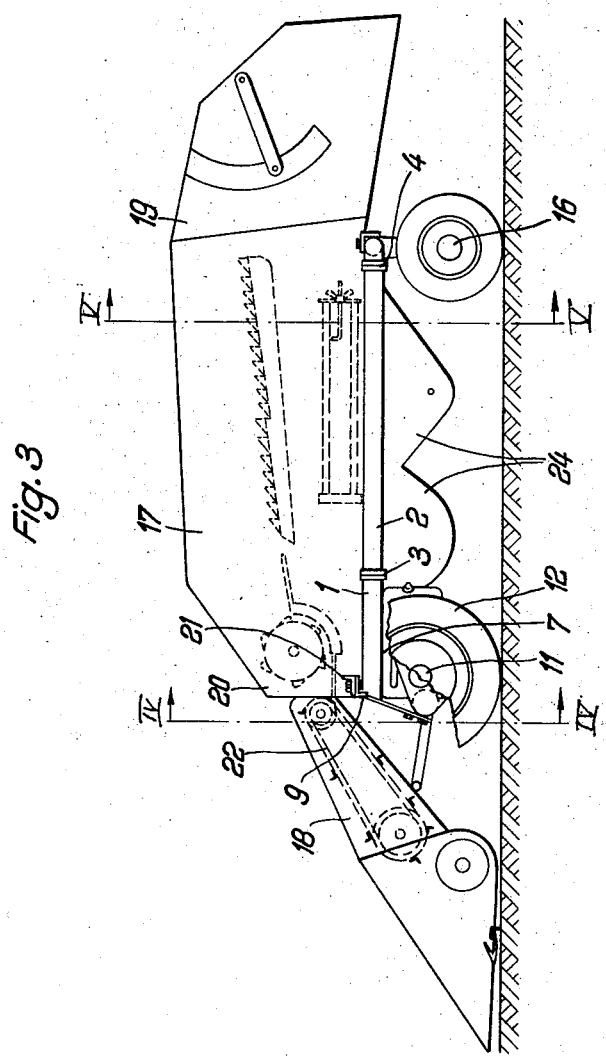

May 26, 1959     A. CLAAS ET AL     2,888,088
CARRIER FOR AGRICULTURAL MACHINERY
Filed Dec. 5, 1956     4 Sheets-Sheet 3
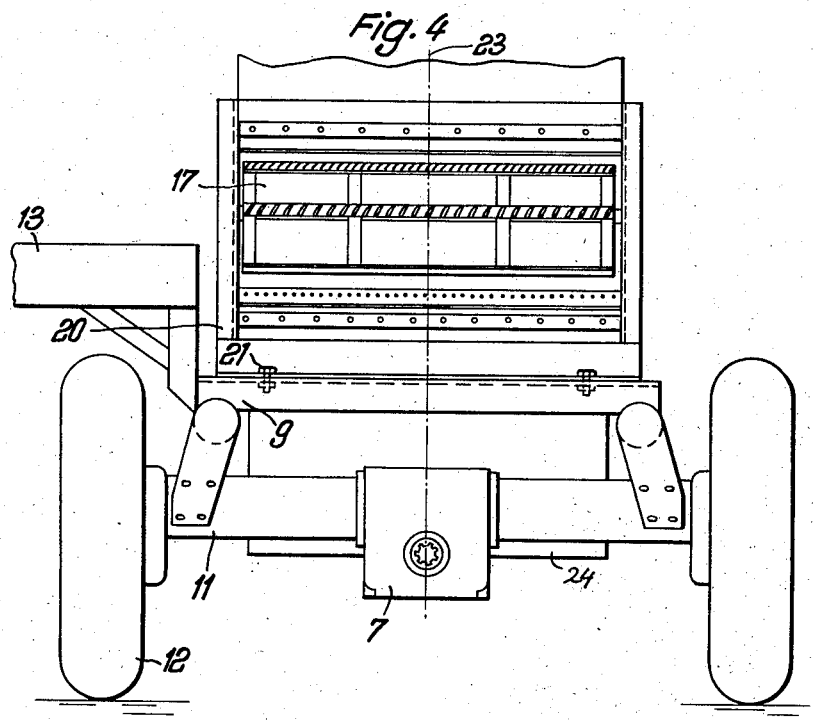
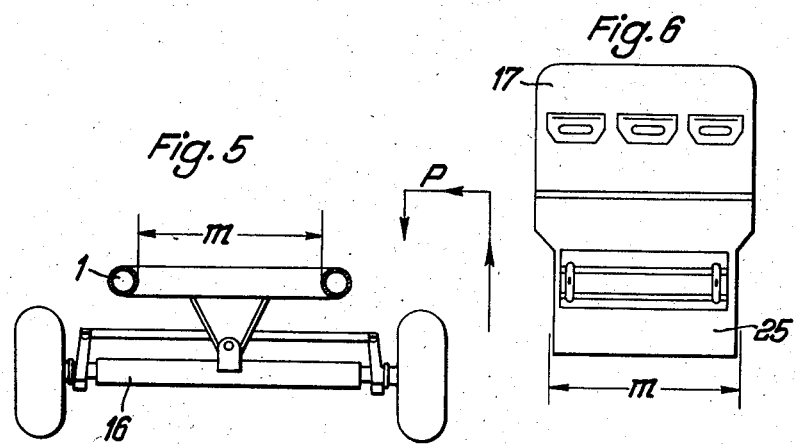
Inventors:
A. Claas, W. G. Brenner, H. Roderfeld and R. Claas
by Richard Geier
ATTORNEYS May 26, 1959 A. CLAAS ET AL 2,888,088
CARRIER FOR AGRICULTURAL MACHINERY
Filed Dec. 5, 1956 4 Sheets-Sheet 4
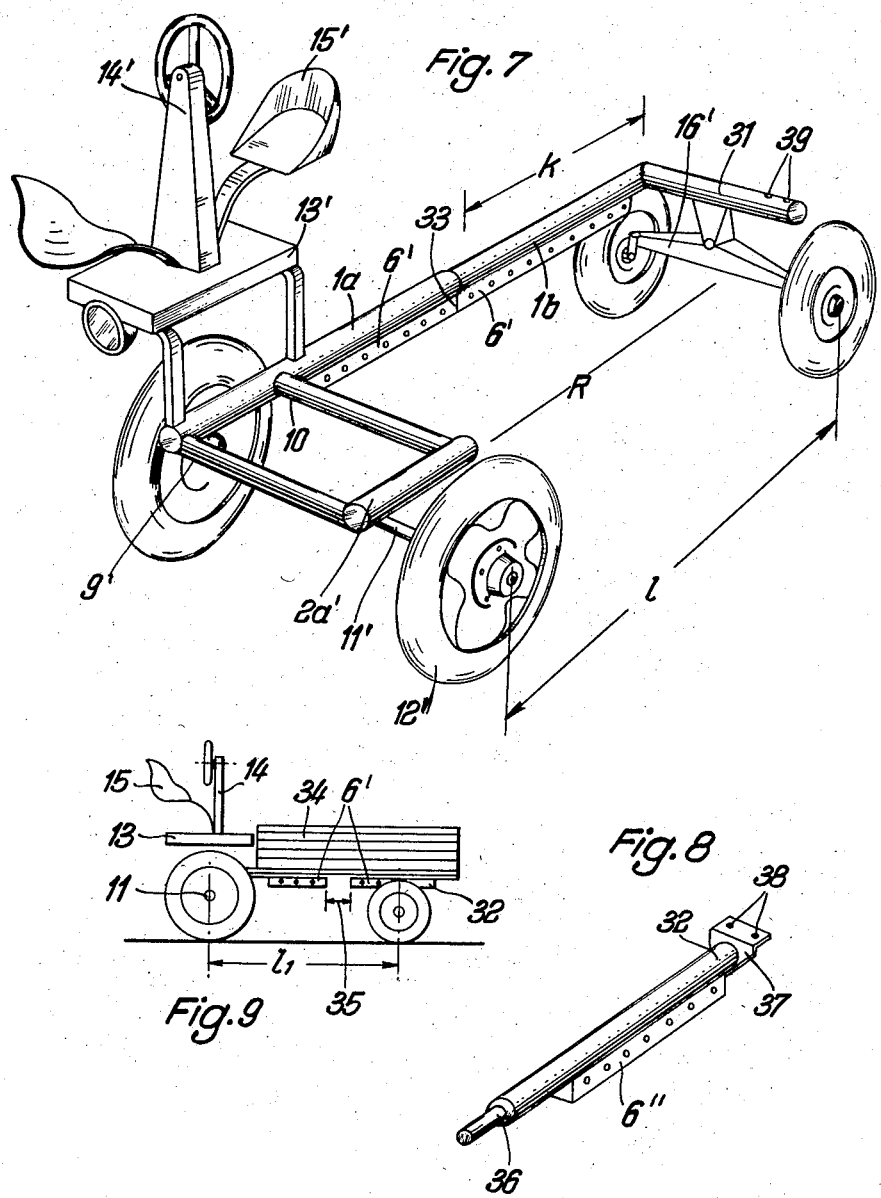
Inventors:
A. Claas, W. G. Brenner, H. Roderfeld and R. Claas
By
Richards y Geier
ATTORNEYS United States Patent Office 2,888,088
Patented May 26, 1959

2,888,088

CARRIER FOR AGRICULTURAL MACHINERY

August Claas, Walter Gustav Brenner, Heinrich Roderfeld, and Reinhold Claas, all of Harsewinkel, Westphalia, Germany Application December 5, 1956, Serial No. 626,517

2 Claims. (Cl. 180—55)

This invention relates to a carrier for agricultural machinery and refers more particularly to a motorized vehicle adapted to serve as a carrier for agricultural machinery of various types and provided with a suspended motor and motor drive.

An object of the present invention is the provision of a carrier of this type which can be adapted to a great variety of uses.

Another object is the provision of a carrier having a frame which can be shortened and extended in a simple manner.

A further object is the provision of a carrier which is so constructed that machinery can be conveniently mounted thereon either between the beams of the frame of the carrier or underneath the beams for the suspension thereon.

A still further object is the provision of a carrier which is so constructed that the machinery can be mounted thereon in a rigid connection without vibrations and be easily accessible from all sides.

Yet another object is the provision of a carrier which can conveniently serve as a support for a mowing thresher.

A further object is the construction of a carrier in such manner that the agricultural machinery mounted thereon can be conveniently and easily attached to the carrier by clamps or flanges.

Still another object is the provision of a carrier so constructed that two or more agricultural implements of similar size can be removably mounted thereon, the device having sufficient free space on all sides so that two or three machines or implements can be operated conveniently from a single carrier.

Other objects of the present invention will become apparent in the course of the following specification.

The objects of the present invention may be realized through the provision of a carrier constituting a vehicle with a suspended motor and drive. The vehicle comprises a frame consisting of removably interconnected supporting beams or beam portions. The space above and below the frame is free so that the machinery can be directly attached to the beams. The vehicle has essentially the form of a rectangular frame composed of interconnected frame elements.

According to a feature of the present invention the longitudinal beams, or at least one of such beams is removably connected with the transverse beams. Parts of the longitudinal beams or transverse beams can telescope one into the other so that to increase the distance between the vehicle axles the telescoping longitudinal beams can be extended, while to increase the width of the frame the telescoping transverse beams can be extended. Obviously, the size of the frame can be diminished by pushing the telescoping parts one into the other.

According to another feature of the present invention the removable beam portions are connected by means of flanges to the beam frame so that after a beam is removed and a beam stump is left, an implement can be conveniently attached to the flange of the beam stump. Furthermore, according to the invention an agricultural implement can be mounted between two beam stumps instead of one beam.

A further feature of the present invention is that the seat for the driver for the forward and rear movement of the vehicle is provided outside of and to the side of the beam frame, for example, transversely to the motor and drive of the vehicle.

A further feature of the present invention consists in that the motor and drive aggregate is substantially clear of the frame and is suspended from one end thereof. Yet another feature is a firm connection of the front beam with the driving axle.

The invention will appear more clearly from the following detailed description when taken in connection with the accompanying drawings showing by way of example preferred embodiments of the inventive idea.

In the drawings:

Figure 3 is a side view of a vehicle carrying a complete mowing thresher.

Figure 4 is a section along the line IV—IV looking in the direction of the arrows.

Figures 5 and 6 are essentially sections along the line V—V of Figure 3 and illustrate diagrammatically the method of placing the mowing thresher upon the vehicle.

Figure 7 is a perspective view of a somewhat differently constructed vehicle of the present invention, some parts having been left out of the drawing for the sake of clarity.

Figure 8 is a perspective view of a removable beam.

Figure 9 shows on a smaller scale a vehicle of the present invention with a car load mounted thereon.

Figure 1:
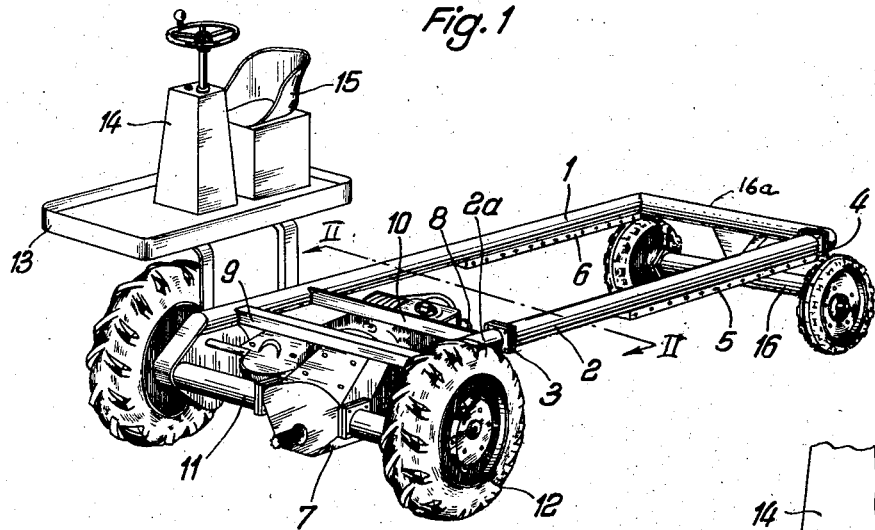
Figure 1 is a perspective view of a vehicle for agricultural machinery having a suspended motor and drive and constructed in accordance with the principles of the present invention.
Figure 2:
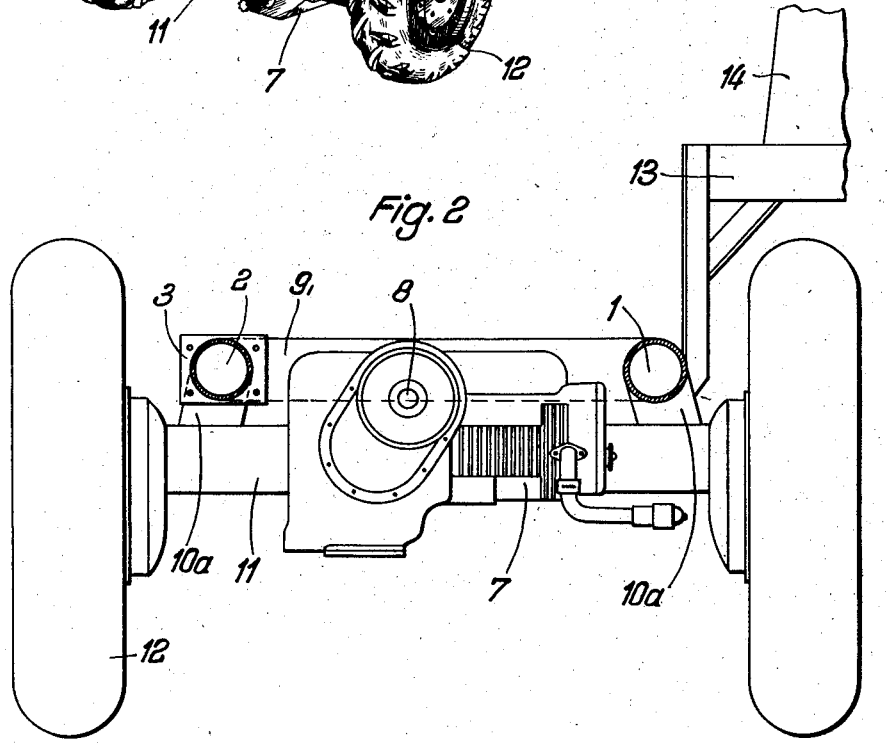
Figure 2 is a section along the line II—II of Figure 1 looking in the direction of the arrows.

The vehicular machinery carrier of the present invention shown in Figures 1 to 6 includes a supporting frame 1 consisting preferably of tubular parts which include a removable longitudinal beam 2 connected by means of flanges 3 and 4 to the rest of the frame. The beam 2 carries perforated ledges 5 and 6 extending below the supporting frame 1 which extends in one plane. The motor and driving aggregate 7 with the exhaust 8 are suspended on the front end of the frame under the transverse beams 9 and 10. The front beam 9 is connected with the driving axle 11 by means of struts 10a. A platform 13 having a driving column 14 and a driver's seat 15 is provided outside of the frame and to the side thereof and is firmly connected to the frame. The driver's seat 15 is so arranged that it does not interfere with the accessibility of the frame and makes it possible to supervise the movements of the vehicle in both directions. The rear axle 16 is firmly connected by a bracket with the rear transverse beam 16a and does not interfere with the accessibility of the frame.

Figure 3 shows the use of the vehicular carrier of the present invention for a complete ready to operate mowing thresher. The front of the casing 17 of the mowing thresher is connected with the front cutter 18 while a piston-operated straw press 19 is attached to the rear of the casing 17. The casing 17 is attached directly to the front beam 9 of the vehicle at the entrance to the casing by means of the frame 20 and the bolts 21. The cutter 18 has approximately the same width as the distance between the two driving wheels 12 of the vehicle. The cutter 18 which is provided with the draw-in elevator 20 extends in front of the front beam 9. The straw press 19 which may be of the swinging piston type, extends over and beyond the rear axle 16.

It is clearly apparent that due to the accessibility of the frame the entire mowing thresher with all its attachments can be easily mounted from one side upon the frame and can be conveniently attached thereto.

As is shown in Figure 4, wherein the cutter 18 and the elevator 22 are not illustrated, the mowing thresher is placed longitudinally symmetrically upon the vehicular carrier, as is indicated by the central line of symmetry 23. The lower parts 24 of the thresher extend below the frame 1 without affecting the accessibility of the frame at the rear of the motor 7 and exhaust 8.

Figures 5 and 6 illustrate diagrammatically the mounting of the casing 17 having the width m upon the vehicle frame 1 which also has the width m. It is apparent that the casing 17 is raised, moved to the side and then lowered in the directions of the arrow P until it is securely mounted upon the frame. This mounting is particularly effective due to the fact that the outer surfaces of the beam frame 1 extend in flat planes and that the under surfaces 25 of the casing 17 also extends in a plane. It is further apparent that the mounting of the casing 17 can be carried out by means of any suitable movable support and that the connecting members 21 and 5 can be used to attach the casing 17 to the frame. In order to remove the mowing thresher these connections are removed and the casing 17 is raised, moved to the side and lowered in the directions opposed to the arrows P. It is advantageous to remove the elongated beam 2 (Figure 1) by unscrewing it at the flanges 3 and 4, thereby further facilitating the mounting of the mowing thresher and the dismounting thereof.

It is apparent from the above that the vehicular carrier of the present invention can be used most effectively in conjunction with very many agricultural machines and in particular with agricultural tillage machinery operable when standing or moving, particularly since all the parts of the vehicular carrier are freely accessible for inspection and operation. It is further apparent that the described vehicular carrier is most secure in operation as far as static loads and also against rattling due to vibrations produced by one of the motors, by the drive of the thresher or even by one of quickly rotating saws which may be mounted upon the vehicle. The beams of the frame are sturdy with respect to oscillation and twisting forces.

In accordance with the present invention the beams of the frame 1 are hollow so that they can be used most effectively as casings for electrical and hydraulic conduits, as well as for suitable steering means, signalling devices and similar apparatus.

A particular advantage of the vehicular carrier of the present invention consists in that the agricultural machinery carried thereby, such as the above described mowing thresher, can extend under the frame 1, above the frame and to the sides thereof; furthermore the large available space within the frame makes it possible to place the center of gravity of the implement mounted thereon, particularly the above described mowing thresher with all its accessories, in a most advantageous position. The implements which are intended for the mounting upon the vehicle can be provided with flanges so that they can be attached by screws between the ends of the beams or to one end of a beam. The implements can be also connected with rod-like or tubular carriers which can be placed within the tubular beam stumps for attachment.

Figure 7 shows a somewhat differently constructed vehicular support wherein a longitudinal beam is provided with telescoping portions 1a and 1b. For the sake of clarity of illustration the motor and the drive are not illustrated in Figure 7 which shows on the other hand transverse beams 9' and 10' upon which the motor is suspended.

The driving axle 11' is connected with the front transverse beams 9' and 10', while the steering axle 16' is connected with a transverse beam 31. A comparison of the construction shown in Figure 7 with that of the construction shown in Figure 1 indicates that in the construction shown in Figure 7 one of the longitudinal beams is missing and is replaced by the beam stump 2a' which extends to the transverse beam 10'. Such a construction provides a large free space designated as R in Figure 7. According to the present invention this free space between the remaining beams is used for mounting purposes. It is apparent that, by way of example, an implement can be mounted upon the beams 9 and 10. Furthermore simultaneously a further implement can be mounted upon the beam 31 and the two implements will not interfere in any way with each other. The removable attachment of the platform 13' with the steering column 14' and the driver's seat 15' will not interfere in any way with the mounting of these implements or the use of the frame of the present invention.

As already stated, one of the longitudinal beams has two telescoping beam portions 1a and 1b which are shown in their end position in which they provide the shortest possible length of the beam. In this position the perforated ledges 6' which are attached to the beam portions engage each other at 33. The beam portion 1b has the operative length $k$ which corresponds to the distance $l$ between the axles of the vehicle.

If a car body 34 shown in Figure 9 is now mounted upon the frame, the telescoping beam portions 1a and 1b can be extended to increase the distance between the axles from $l$ to $l_1$. Then the opposed surfaces of the ledges 6' will be spaced apart from each other by the distance 35, as shown in Figure 9.

Another possibility of connecting the beam portions to the frame is indicated in Figure 9. While the telescoping beam portions 1b and 1a slide relatively to each other, the projecting end 36 of the beam 32 (Figure 8) can be inserted into the beam stump 2a' shown in Figure 7 and firmly mounted therein. The opposite end of the beam 32 shown in Figure 8 is provided with a flange 37 which can be mounted upon the transverse beam 31 so that the bore holes 38 of the flange 37 are in alignment with the holes 39 provided in the beam 31. Then pins or screws may be inserted into these holes to provide a firm connection.

It is apparent that the angular flange 37 shown in Figure 8 is substantially the same in function as the flat flange 3 shown in Figure 1.

It is apparent that the load 34 shown in Figure 9 consists of a load of wood, timber or the like. It is also apparent that the frame of the present invention can not only be shortened or expanded to the lengths $l$ and $l_1$ but that the width of the frame can also be extended or shortened by the provision of telescoping transverse beams and by suitably connecting such telescoping transverse beams to the longitudinal beams. Furthermore the individual beams, such as the beam stump 2a' or any other beam stump, can be made individually shiftable in the longitudinal or transverse directions of the frame.

All such or other variations and modifications are to be included within the scope of the present invention.

What is claimed is:

1. A carrier for agricultural machinery, said carrier comprising a longitudinal beam having telescoping portions, downwardly extending perforated ledges carried by said telescoping portions, two parallel transverse beams having ends connected to one of said telescoping portions at the front end thereof, a hollow beam stump interconnecting the other ends of said two transverse beams, a front wheel-carrying axle suspended from one of said transverse beams, a motor drive suspended from at least one of said transverse beams, a driver's platform carried by said front end of said one telescoping portion and located substantially opposite said two transverse beams, whereby said longitudinal beam extends substantially between said driver's platform and said transverse beams, another transverse beam having one end connected to the rear end of the other telescoping portion, and a rear wheel-carrying axle suspended from the last-mentioned transverse beam.

2. In a carrier in accordance with claim 1, another longitudinal beam having one end comprising a projecting end portion fitting into said hollow beam stump, a downwardly extending perforated ledge carried by said other longitudinal beam, the perforations of the last-mentioned ledge being adapted to aline with the perforations of the ledges carried by said telescoping portions, and a flange having bore holes and carried by the other end of said other longitudinal beam, the last-mentioned transverse beam having bore holes adapted to aline with the bore holes of said flange.

References Cited in the file of this patent
UNITED STATES PATENTS

| | | |
|---|---|---|
| 1,348,039 | Niceley | July 27, 1920 |
| 1,366,771 | Devencenzi | Jan. 25, 1921 |
| 2,152,804 | Hays | Apr. 4, 1939 |
| 2,496,537 | Huff | Feb. 7, 1950 |
| 2,528,275 | Heth | Oct. 31, 1950 |
| 2,536,147 | Andrews | Jan. 2, 1951 |
| 2,670,582 | Hyman | Mar. 2, 1954 |
| 2,743,784 | Karlsson | May 1, 1956 |
| 2,782,864 | Fessia | Feb. 26, 1957 |
| 2,796,140 | Knolle | June 18, 1957 |